United States Patent [19]

Kidd

[11] 4,057,282
[45] Nov. 8, 1977

[54] VEHICLE TRAILER

[76] Inventor: Kenneth B. Kidd, 3722 W. Peoria, Phoenix, Ariz. 85029

[21] Appl. No.: 676,729

[22] Filed: Apr. 14, 1976

[51] Int. Cl.² ............................................. B60P 3/34
[52] U.S. Cl. .................................... 296/10; 296/23 R
[58] Field of Search .................... 296/10, 23 F, 23 R, 296/27, 28 R, 28 M, 23, 28

[56] References Cited
U.S. PATENT DOCUMENTS

| 3,582,131 | 6/1971 | Brown | 296/27 |
| 3,823,975 | 7/1974 | Cooper | 296/23 R |

Primary Examiner—Philip Goodman
Attorney, Agent, or Firm—Martin L. Stoneman

[57] ABSTRACT

A vehicle trailer for attachment to automobiles and the like having a luggage-type form in its closed position but being adapted by structure and hinge location to open to a first alternative position of a tool trailer and a second alternative position of a standard utility trailer.

5 Claims, 3 Drawing Figures

VEHICLE TRAILER

BACKGROUND OF THE INVENTION

This invention relates to vehicle trailers.

More particularly, the invention concerns a vehicle trailer comprising a generally luggage-like container having an upper box-like member, a lower box-like member, and a rear panel.

In a further aspect, the invention concerns a vehicle trailer especially adapted for use in three alternative positions, which three uses may be generally referred to as luggage trailer, tool trailer, and standard utility trailer.

It has become a problem, with the ever-increasing use of compact and sub-compact automobiles, to provide sufficient luggage space for the desired vehicle use. Even when trailers known in the prior art are used to solve space problems by attachment to the rear of such automobiles, there are usually additional problems created, such as additional difficulty of handling for inexperienced drivers, loss of fuel economy, parking problems due to exceeding the length of standard parking spaces, etc.

Furthermore, it is well known that different trailers are best adapted for different uses, and there is a need for a trailer which is well adapted to a multiplicity of uses.

It would be highly advantageous, therefore, to provide a vehicle trailer which is not only adapted to a multiplicity of uses, but provides also for the solution of the other problems hereinbefore mentioned with respect to the prior art.

SUMMARY OF THE INVENTION

Accordingly, it is the primary object of the present invention to provide an improved vehicle trailer.

Another object of the present invention is the provision of a vehicle trailer adapted to a multiplicity of uses, including the uses of luggage trailer, tool trailer, and standard utility trailer.

Still another object is to provide a vehicle trailer which even an inexperienced driver may handle with ease.

Yet another object of the present invention is the provision of a vehicle trailer of the above type which allows both vehicle and trailer to fit in a standard parking space.

Even another object is to provide a vehicle trailer which allows additional luggage to be carried in a compact or sub-compact automobile in a weathertight manner while maintaining fuel economy.

Yet still another object of the present invention is the provision of a vehicle trailer of the above type which is efficient in its manner of operation, relatively inexpensive to manufacture, and having a high degree of durability and serviceability.

Briefly, to accomplish the desired objectives of the present invention in accordance with a presently preferred embodiment thereof, there is provided a vehicle trailer having wheel means thereunder and attachment means at the front of the trailer for attaching the trailer to the rear of the vehicle. Mounted on the wheel is a box-like member open at its top and rear. A second box-like member open at its bottom end rear is hingedly attached to the first box-like member, the hinged attachment means being between the upper rear corners of the first box-like member and the lower rear corners of the second box-like member. A panel is hingedly attached to the lower rear of the first box-like member, and a hinged arm member further attaches the panel to the first box-like member, the hinged arm member extending between a pin attachment adjacent to the hinged attachment means between the box-like members and pin means located in the panel member. These parts are constructed and arranged so that the panel when in its upright position closes the rear open faces of both box-like members, and the panel when in its down position is parallel and substantially in line with the bottom side of the first box-like member, so that the second box-like member when rotated about the hinges between the box-like members comes to rest and is supported by the panel. The trailer of the present invention is further provided with warning lights or signals and locking attachments to stabilize the trailer in its desired position of use and for purposes of safety.

BRIEF DESCRIPTION OF THE DRAWINGS

Further and more specific objects and advantages of the present invention will become readily apparent to those skilled in the art from the following detailed description thereof taken in connection with the drawings, in which.

DETAILED DESCRIPTION OF THE PREFERRED EMBODIMENT

Figure 1:
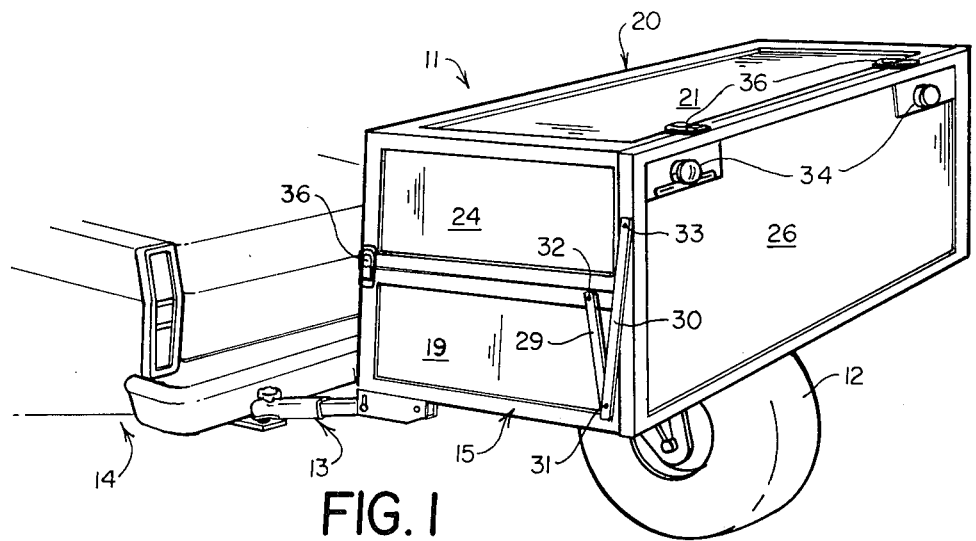
FIG. 1 is an artistic view in perspective of the preferred embodiment of the vehicle trailer of the present invention, shown in position for use as a luggage trailer and attached to the rear of a vehicle.

Turning now to the drawings, in which the reference numerals indicate corresponding elements throughout the several views, FIG. 1 illustrates the presently preferred vehicle trailer 11 shown in its position for use as a luggage trailer. A wheel 12 is attached to the underside of the trailer 11 in a conventional way and supports railer 11. Conventional attachment devices 13 are attached to the front end of trailer 11 and serve to attach trailer 11 to the rear of the vehicle 14 in conventional ways. Mounted atop wheel 12 is a first box-like member 15 having four sides: A horizontal side or base 16 and vertical sides 17, 18, and 19. Box-like member 15 is open at its top and rear. Shown atop box-like member 15 is a second box-like member 20 having four sides: horizontal side 21; and vertical sides 22, 23, and 24. Box-like member 20, in its position as shown in FIG. 1, is open at its bottom and rear. A set of hinges 25 (best seen in FIGS. 2 and 3) attach box-like member 15 to box-like member 20, hinges 25 being located and attached at the upper rear corners of box-like member 15 and being further attached to the lower rear corners of box-like member 20 as shown. Panel 26 is hingedly attached to box-like member 15 at hinge 27 (best seen in FIGS. 2 and 3), and panel 26 when in its upright position as shown in FIG. 1 serves to close the rear sides of box-like members 15 and 20, thus completing an enclosed luggage trailer.

Figure 2:
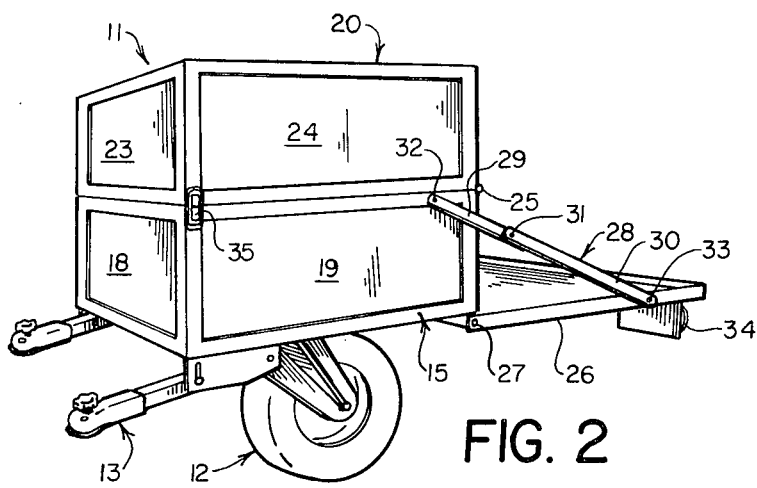
FIG. 2 is a perspective view of the illustrated preferred embodiment of the present invention, showing the same in position for use as a tool trailer.
Figure 3:
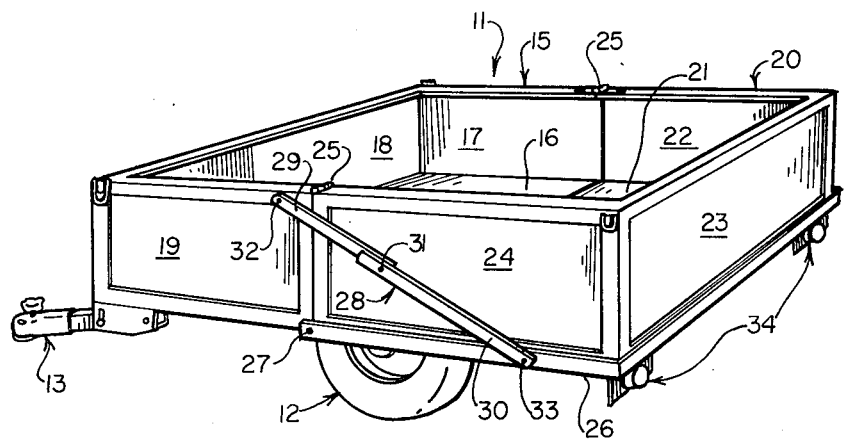
FIG. 3 is a perspective view of the illustrated preferred embodiment of the present invention, showing the same in position for use as a standard utility trailer.

Hinged arm member 28 (a similar hinged arm member may be provided on the other side of trailer 11)

consists of a first section 29 and second section 30 connected at pin 31. Hinged arm member 28 serves to connect box-like member 15 at pin 32 with panel 26 at pin 33. This construction of hinged arm member 28 serves to support in a conventional way panel 26 in its lowered position as shown in FIGS. 2 and 3. Further illustrated are signals or lights 34 which are mounted adjacent the upper corners of panel 26 when in its upper position (FIG. 1) and are lowered in a swivel manner (FIGS. 2 and 3) when panel 26 is in its lowered position. Locking attachment 35 serves to connect and lock box-like member 15 to box-like member 20 in a conventional way as shown. Locking attachment 36 serves to connect and lock panel 26 to box-like member 20 in a conventional way as shown.

With particular reference to FIG. 2, trailer 11 is shown in its position as a tool trailer. In comparison to the position of trailer 11 in FIG. 1, panel 26 has been unlocked (at 36) and lowered about hinge 27 to its horizontal position, as shown in FIG. 2. Hinged arm member 28 has been straightened to its full extension and provides support for panel 26 at pin 33 in this lowered position of panel 26. It is noted that the position, construction, and arrangement of hinge 27 and panel 26 are such that panel 26, when in its lowered position, has its upper face in a horizontal plane which is below the horizontal plane of the upper face of side 16 in an amount and distance approximating the thickness of side 21 of box-like member 20.

With particular reference to FIG. 3, the trailer 11 is shown in its position as a standard utility trailer. In comparison to the position of trailer 11 as shown in FIG. 2, box-like member 20 has been rotated around hinges 25 until side 21 has changed position from being the upper side of box-like member 20 to being the lower side of box-like member 20 and box-like member 20 has come to rest at the position where it is supported by panel 26. It is noted that the floor of trailer 11 as shown in FIG. 3 is approximately level because of the lowered position of panel 26 as previously noted in the preceding paragraph.

Thus it is seen that trailer 11 may be utilized in three positions: in full open position, as a standard utility trailer; with the rear door folded down, as a tool trailer; and in full folded position, as a weathertight luggage trailer. Further it is seen that when trailer 11 is in its position as shown in FIG. 1 (luggage trailer), an extremely compact trailer is provided which may easily be constructed, arranged, and attached in cooperation with a compact or a sub-compact automobile so that an inexperienced driver may handle it with ease and allowing both the automobile and trailer to fit in a standard parking space. It is now also seen that the fuel economy of a compact car may be realized in an efficient manner while providing additional luggage space as needed. It is now further seen that the efficient and compact trailer of the present invention is simple in construction and design and yet easily adaptable to its mentioned uses.

Various changes in the device herein shown for the purpose of illustration will readily occur to persons skilled in the art. Such modifications and variations, while not explicitly denoted in the foregoing detailed description of the preferred embodiment, do not deviate from the teachings of the present invention and are intended to be included in the spirit and scope thereof, and the scope of the present invention is intended to be limited only by a fair interpretation of the following claims:

I claim:

1. A vehicle trailer comprising: a base structure comprising wheel means and attachment means constructed and arranged for attaching said trailer to the rear of a vehicle; mounted atop said wheel means, a first box-like member having four sides and being open at its top and rear; attached to said first box-like member and having a first stable position atop said first box-like member, a second box-like member having four sides and being open at its bottom and rear; hinged attachment means between said box-like members between the upper rear corners of said first box-like member and the lower rear corners of said second box-like member; a panel hingedly attached to the lower rear of said first box-like member and attached by a hinged arm member to said first box-like member, said hinged arm member being positioned between a first pin in said first box-like member located adjacent to said hinged attachment means and a second pin in said panel; so constructed and arranged that said panel when in an upright first stable position closes the rear open sides of both said first box-like member and said second box-like member and said panel when in a horizontal second stable position is adjacent, to the rear, and substantially in line with the bottom side of said first box-like member, so that said second box-like member, when rotated about said hinged attachment means comes to rest and is supported by said panel when said panel is in its horizontal second stable position, said bottom open side of said second box-like member thereby becoming the upper side of said second box-like member.

2. The vehicle trailer of claim 1 including a warning signal hingedly mounted on said panel.

3. The vehicle trailer of claim 1 including a first locking means between a front portion of said first box-like member and a front portion of said second box-like member.

4. The vehicle trailer of claim 1 including a second locking means between said second box-like member and said panel.

5. The vehicle trailer of claim 1 wherein the upper surface of said panel when said panel is in a horizontal second stable position is lower than the upper surface of the lower side of said first box-like member by a distance substantially equal to the thickness of the upper side of said second box-like member (when said second box-like member is above said first box-like member).

* * * * *